Feb. 27, 1934.   J. McEWAN   1,948,989
PROCESS OF AND APPARATUS FOR MOLDING ARTICLES
Filed May 21, 1932   2 Sheets-Sheet 2
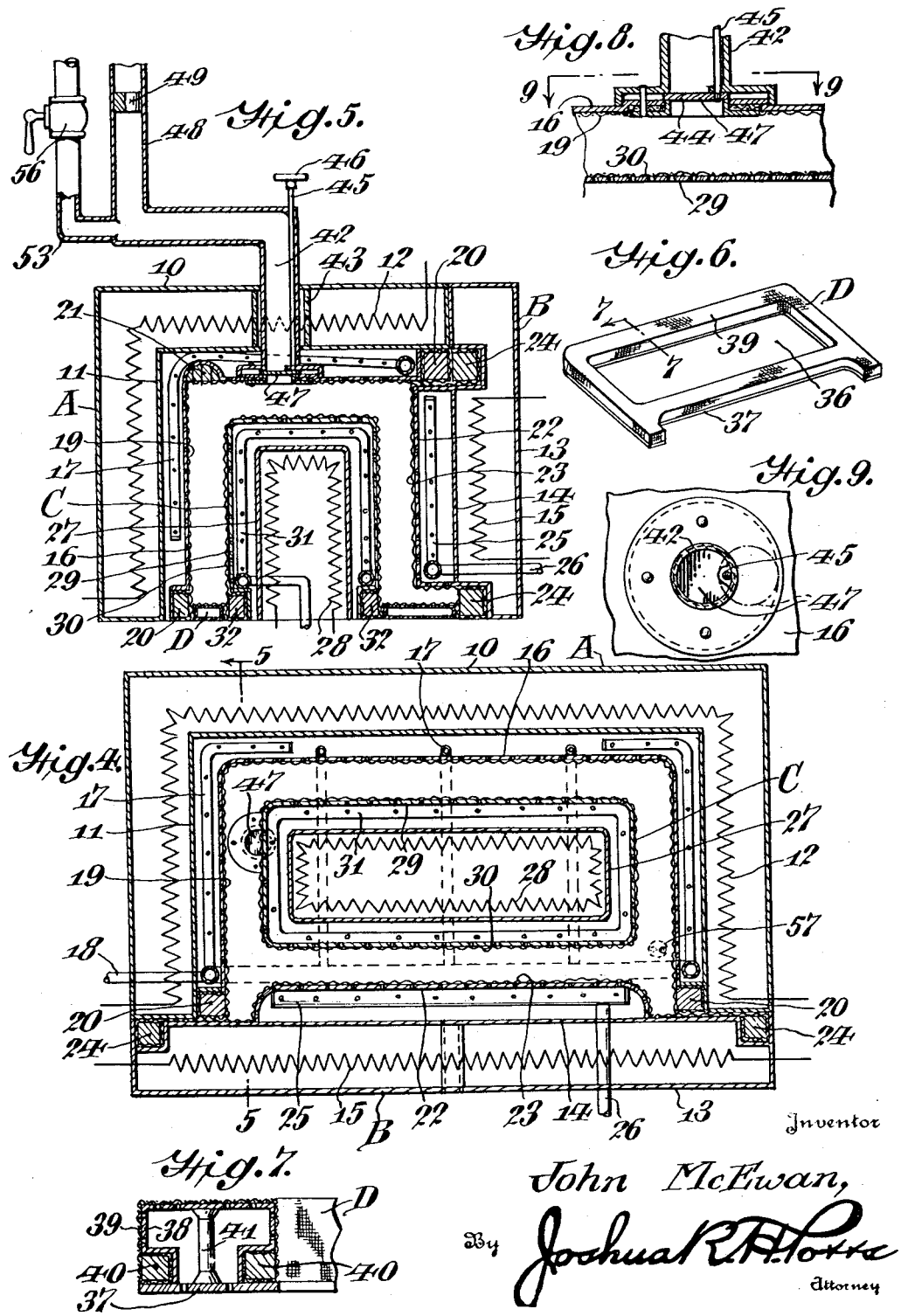

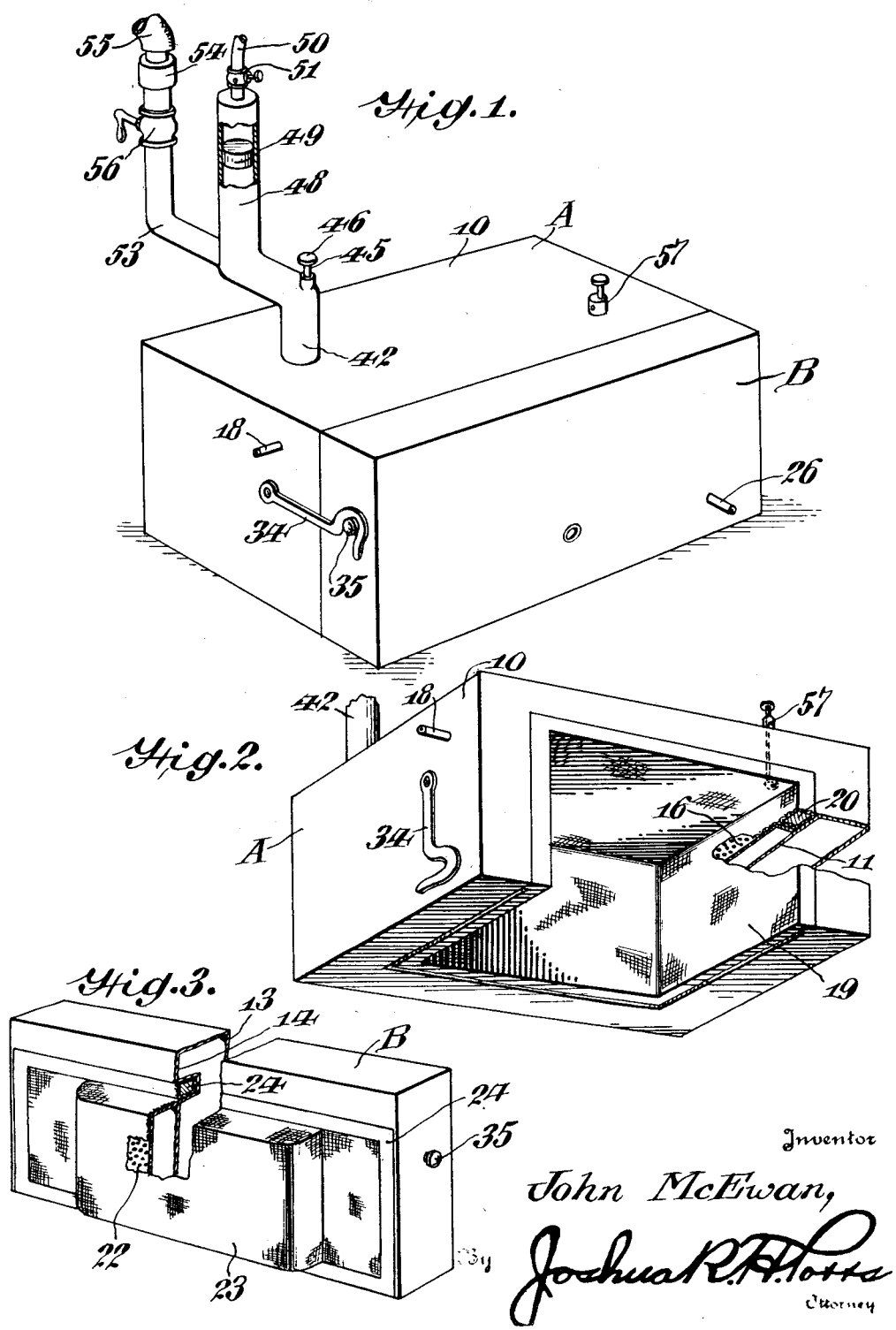

Patented Feb. 27, 1934

1,948,989

UNITED STATES PATENT OFFICE 1,948,989

PROCESS OF AND APPARATUS FOR MOLDING ARTICLES

John McEwan, Trenton, N. J., assignor of one-half to James J. Kelly, Trenton, N. J.

Application May 21, 1932. Serial No. 612,661

9 Claims. (Cl. 25—129)

This invention relates to process of and apparatus for molding articles, and has for an object to provide improved means for molding articles of clay or like substance, with improved means for drying and hardening the molded article within the mold.

A further object of the invention is to provide an apparatus and process of molding an article, wherein the article of clay or like material is molded against a fabric supported by a foraminous wall, with heating and drying elements positioned adjacent to the wall.

A further object of the invention is to provide an apparatus for and process for molding a hollow article composed of clay, or like material, having supporting walls and core, each composed of a fabric which adjoins the article and receives the introduced mixture, such fabric being supported by relatively rigid foraminous walls, with a heating unit contiguous to these walls, and conduits for the introduction of drying air also contiguous to the walls.

The invention therefore comprises the process of molding and apparatus for carrying out the process consisting in providing a separable mold and removable core, each unit of which is built up of a relatively rigid foraminous wall substantially the form of the molded article, with a fabric positioned on the side of the wall next the molded article, with perforated air pipes located adjacent to the foraminous wall, and a heating chamber in each unit spaced away from the foraminous wall a sufficient distance to position the air pipes.

The drawings illustrate an embodiment of the invention and the views therein are as follows:

Figure 1 is a perspective view of a mold for carrying out the process,

Figure 2 is an inverted perspective view of the main part of the mold, certain parts being broken away, Figure 3 is an inverted view of the minor part of the mold, parts being broken away, Figure 4 is a sectional view longitudinally and horizontally through the mold in its complete form, Figure 5 is a transverse sectional view through the mold in inverted position, Figure 6 is a perspective view of the stripping ring, Figure 7 is a sectional view of the stripping ring, taken on line 7—7 of Figure 6, Figure 8 is a detail enlarged sectional view of the inflow valve, and Figure 9 is a view of the inflow valve structure taken on line 9—9 of Figure 8.

Like characters of reference indicate corresponding parts throughout the several views.

In carrying out the process involved, a variety of apparatuses might be employed. In the drawings, a type has been shown which will carry out the process, and embodies the basic features found necessary in practicing the process. The mold therefore comprises a major section A, a minor section B, with a core C. The major section A is built with spaced walls 10 and 11 forming a completely closed chamber in which is located a heating device.

As disclosed in the drawings, an electric element 12 is indicated, but it is to be understood that any other means for heating the chamber provided by said walls 10 and 11 are within the scope of the present invention.

The minor section B is also constructed of spaced walls 13 and 14, with a similar means for heating indicated at 15, with the same range of equivalents.

Within the space provided by the inner wall 11, a wall 16 is erected. This wall is preferably of some foraminous relatively rigid material. Within the space provided by the wall 16, and the wall 11, air conduits 17 are provided. These conduits communicate with the exterior in any approved manner as by the nipple 18.

Within the wall 16, a fabric 19 is placed and held therein in such manner as found desirable as by means of the beads 20. Other beads 21 may also be employed for holding the fabric against separation from the foraminous wall 16.

The minor section B is likewise provided with foraminous walls 22 and fabric liner 23, and the fabric in this case may be held by the beads 24. Air pipes 25 also perforated, are provided in this minor section and extend outwardly for attachment with external air as at 26.

The core member C is similarly constructed with walls 27 forming a chamber in which a heating element 28 is positioned and surrounded by a similar foraminous wall 29 with a fabric liner 30. Perforated air pipes 31 are similarly located within the space between the heating chamber and the foraminous wall, while the liner 30 may be held in position by beads 32.

Some means is provided for holding the major and minor sections in operative relation, here shown as the hooks 34 carried by one section engaging pins 35 carried by the other section.

The mold as shown in the drawings is intended for molding a closet tank and the shape as provided is the shape of such tank. This is only by way of illustration, and the mold may be and will be of such shape, size and contour as will mold any article desired. For the mold of the shape provided in the drawings, a stripping plate D is employed. This simply fills the lower side of the mold when it is in proper molding relation as shown at Figure 1, and corresponds to the aperture presented between the combined sections A and B and the core C. This is shown more particularly at Figure 4. This stripping plate will close the bottom opening thus provided so that when the article is molded, it will rest upon the stripping plate D and the mold sections A and B may be separated and removed from the article so resting upon the stripping plate and the core withdrawn through the central opening 36.

This stripping plate is preferably also of such nature as to permit circulation of air. It is composed of a base plate 37 upon which is erected a foraminous tubular structure 38, which in turn is embraced by a fabric 39. The fabric in this case may also be retained by beads 40. For strengthening this stripping ring to support the article, struts 41 may be inserted bearing upon the base plate 37 and supporting the top, upon which surface the molded article will rest after the mold has been seperated and the core withdrawn. The stripping plate is employed for handling the article resting thereon until the article is sufficiently dried to be handled with safety.

For introducing the plastic or semi-liquid material into the mold, a conduit 42 is introduced through the major section A and is preferably insulated from the heating chamber by means of an insulating liner 43. Upon the inner end, this conduit 42 is provided with a closure 44 which is mounted upon a rod 45 passing through the conduit. Upon the exterior, some means as the hand wheel 46 is provided for turning this closure. As disclosed at Figures 5 and 9, the closure is provided with a fabric liner 47 to correspond to the fabric liner within the mold cavity so that the surface imparted to the molded article may be similar throughout.

This conduit 42 communicates with a stand pipe 48 in which is located a piston 49 (see Figure 1). An air line 50 is connected to this stand pipe 48 through the medium of a valve 51 which may be manipulated to put the air line 50 in communication with the stand pipe 48, or to serve as a bleeder through the opening 52.

Offset from the stand pipe 48 is an elbow 53 having a hose connection 54 for the hose 55. A cock 56 controls the passage through the elbow 53. At a point as remote from the inlet 42 as conveniently can be arranged in the major section A, a vent 57 is provided. This vent 57 may be in all respects similar to the valve construction 47. It would be desirable to make a difference in size, the vent 57 being smaller than the inlet 42, but the size is unimportant.

In carrying out the process in this case, the mold sections are united as shown at Figure 1, the core placed in position from the bottom and the stripping ring D placed in position. This forms a complete mold cavity, proximate surfaces of which are fabric in each case supported by a foraminous plate. The material from which the article is to be molded, as for instance a clayey material, in semi-liquid form, is introduced through the conduit 42 to completely fill the mold.

The heating chambers heretofore described, are preferably retained in heated condition at all times when the device is in use, so that when the material has flowed into the mold, the heat is already generated within the mold to begin the drying process.

Air, preferably heated air, is now introduced through the pipes into the chambers between the heating chamber and the foraminous walls so that all moisture is rapidly carried away and any moisture which may tend to drip, passes the stripping ring D and through the spaces and vents.

Material of the nature mentioned shrinks during drying process, hence, means is provided for maintaining a continual feeding of the material to the mold during such drying. As pointed out, the material is introduced through the hose 55 and elbow 53. This communicates directly with the stand pipe 48 so that as the material enters, the piston 49 is moved upwardly, the valve 51 being so opened as to bleed through the opening 52 to permit the piston to rise. The material thus entering through the stand pipe 48 and conduit 42 after completely filling the mold, will raise this piston to the top of the stand pipe.

The flow of material through the elbow 53 being discontinued by the manipulation of the valve 56, air is admitted through the air line 50, the valve 51 being now so arranged that the air is delivered on the top of the piston 49 tending to force this piston downwardly and to force material contained therein into the mold.

This maintains a constant pressure upon the material within the mold which increases the density, and therefore, makes a more perfect article. At such time as experience now shows is the proper time, the closure 44 is operated through the medium of the hand wheel 46 to close the conduit 42. The flow of material into the mold or back flow of the material out of the mold is thereby and thereupon interrupted so that the article may harden in the proper form without further introduction of material.

It has been founded that such a mold employing the various features referred to will produce an article in such condition as to be handled in very much shorter time than where no circulation of air or heat, or combination of these instrumentalities is provided. The process therefore greatly speeds up production and the apparatus as shown lends itself to the carrying out of this process which, however as noted in the beginning of the specification, may be practiced by an apparatus differing in some respects from that shown.

Of course, when the article molded has been sufficiently dried, if the appaartus is used as shown in the drawings, the mold will be separated, the core removed and the article manually or otherwise removed upon the stripping plate D upon which it will remain until more thoroughly dried and cured.

Of course, the apparatus for molding articles, herein illustrated, may be modified and changed in various ways without departing from the invention herein set forth and hereinafter claimed.

The invention is hereby claimed as follows:

1. The process of molding an article consisting in introducing semi-liquid material into a mold having foraminous walls and fabric liner, maintaining heat affecting the surface, and introducing air around the surface of the mold wall to eliminate moisture.

2. The process of molding an article consisting in introducing into a mold cavity surrounded by a fabric supported by a foraminous wall a semi-liquid material, maintaining a heated chamber spaced from the foraminous wall, and circulating air within the space between the foraminous wall and the heated chamber.

3. The process of molding an article consisting in properly tempering a clayey material to semi-liquidity, pouring said material into a mold in engagement with a fabric supported by a foraminous wall conforming to the shape of the article to be molded, maintaining a heated chamber spaced away from the foraminous wall, circulating air within the space intervening between the heated chamber and the foraminous wall, and maintaining an auxiliary supply of the molding material for compensating for shrinkage of the filled mold.

4. An apparatus for molding an article comprising a mold of major and minor parts, each part being provided with a foraminous wall corresponding to the contour of the article to be molded, a fabric liner within the foraminous walls, a heating chamber spaced away from the foraminous walls, and air conduits located within the space between the heating chamber and the foraminous wall.

5. An apparatus for molding articles comprising foraminous walls contoured complementary to the exterior of the article to be molded and made in separable sections, fabric liners for each of the sections, a heating chamber for each of the sections spaced away from the foraminous walls, air conduits located in the space intervening between the heating chambers and the foraminous walls of each section, and a core contoured complementary to the interior of the article to be molded, said core likewise provided with foraminous walls, heating chamber, air pipes, and fabric member.

6. An apparatus for molding articles comprising a mold of separable sections having internally positioned foraminous walls and fabric overlay, heating chambers surrounding the foraminous walls, a conduit introduced through one of the sections for introducing material, and means for maintaining a supplemental body of material in communication with the conduit.

7. The process of molding an article consisting in introducing plastic material into a wholly enclosed mold cavity defined by foraminous walls contoured complementary to substantially the entire surface of the article, with fabric interposed between the walls and the material and removing moisture from the exterior of the walls.

8. The process of molding an article consisting in introducing plastic material into a wholly enclosed mold cavity defined by foraminous walls contoured complementary to substantially the entire surface of the article, with fabric interposed between the walls and the material, and introducing air in a manner to circulate in engagement with the foraminous walls.

9. The process of molding an article consisting in introducing plastic material into a wholly enclosed mold cavity defined by foraminous walls contoured complementary to substantially the entire surface of the article, with fabric interposed between the walls and the material, introducing air in a manner to circulate in engagement with the foraminous walls, and heating the circulating air.

JOHN McEWAN.